(12) United States Patent
Van Cleave et al.

(10) Patent No.: US 7,707,049 B2
(45) Date of Patent: Apr. 27, 2010

(54) SYSTEM AND METHOD OF PROVIDING PRICING INFORMATION

(75) Inventors: Robert Jackson Van Cleave, San Antonio, TX (US); James Steven Kuhn, Helotes, TX (US); Karen Marie Moritz, Fair Oaks Ranch, TX (US); Steven Carl Mills, San Antonio, TX (US); Myron Leo Dye, San Antonio, TX (US); Larry Wayne Clark, San Antonio, TX (US); David Ray Pawelek, Pleasanton, TX (US)

(73) Assignee: United Services Automobile Association, San Antonio, TX (US)

( * ) Notice: Subject to any disclaimer, the term of this patent is extended or adjusted under 35 U.S.C. 154(b) by 1524 days.

(21) Appl. No.: 10/677,763

(22) Filed: Oct. 2, 2003

(65) Prior Publication Data

US 2004/0128172 A1 Jul. 1, 2004

Related U.S. Application Data

(60) Provisional application No. 60/415,408, filed on Oct. 2, 2002.

(51) Int. Cl.
*G06Q 40/00* (2006.01)
(52) U.S. Cl. ........................................................ 705/4
(58) Field of Classification Search .................. 705/4
See application file for complete search history.

(56) References Cited

U.S. PATENT DOCUMENTS

| | | | |
|---|---|---|---|
| 4,831,526 A | 5/1989 | Luchs et al. | |
| 5,797,134 A | 8/1998 | McMillan et al. | |
| 5,809,478 A | 9/1998 | Greco et al. | |
| 6,154,731 A | 11/2000 | Monks et al. | |
| 6,182,048 B1 | 1/2001 | Osborn et al. | |
| 6,272,528 B1 * | 8/2001 | Cullen et al. | 705/36 R |
| 2001/0023404 A1 | 9/2001 | Ogawa et al. | |
| 2002/0026334 A1 | 2/2002 | Igoe | |
| 2002/0035484 A1 | 3/2002 | McCormick | |
| 2002/0046053 A1 | 4/2002 | Hare et al. | |
| 2002/0046064 A1 | 4/2002 | Maury et al. | |
| 2002/0046144 A1 | 4/2002 | Graff | |
| 2002/0052765 A1 | 5/2002 | Taylor | |

FOREIGN PATENT DOCUMENTS

WO    WO 01/39090 A1    5/2001

* cited by examiner

*Primary Examiner*—C. Luke Gilligan
*Assistant Examiner*—Valerie Lubin
(74) *Attorney, Agent, or Firm*—Schwegman, Lundberg & Woessner, P.A.

(57) ABSTRACT

The present invention provides a system and method capable of providing an estimated premium without extensive and repetitive questioning. The present invention utilizes unique assumptions to dramatically reduce the amount of information that must be provided by the customer. In one embodiment, the present invention utilizes a mainframe computer system, an application server, and an external rules management system to interact with the customer via an attractive graphic user interface. Once logged onto the website of the present invention, the customer may choose to engage in a fast quote process which utilizes assumptions, driver information, and vehicle information to assess the risk associated with insuring the customer and then calculates an estimated cost to insure.

22 Claims, 24 Drawing Sheets

SYSTEM AND METHOD OF PROVIDING PRICING INFORMATION

This patent application claims priority on a provisional application entitled "Fast Quote", Ser. No. 60/415,408, having a filing date of Oct. 2, 2002.

FIELD OF THE INVENTION

The present invention relates generally to electronic commerce and, more particularly, to a system and method of providing an on-line, real-time quote for one or more insurance products.

BACKGROUND OF THE INVENTION

In order to acquire many types of products, it is often necessary for a potential customer to first provide information to the product provider. This information enables the provider to decide whether or not providing the product to the potential customer is a reasonable business risk. For example, an individual or company who desires to obtain insurance usually must complete a paper application, disclosing the person's name, address, and other information.

Using this information, one or more persons employed by or acting on behalf of the company performs a manual underwriting process, in which the representative makes a decision whether or not to offer the requested insurance to the individual. In some cases, the representative requires the individual to provide additional information or to submit to a vehicle inspection during the underwriting process.

If insurance will be offered, a representative calculates a premium payment, and prepares a quote for the individual's review. If the quote appears accurate and acceptable to the individual, a representative prepares a contract. Once signed, the contract is binding, and coverage will be enforced as of a specified coverage date.

Known on-line quoting tools for insurance products typically require an extensive time commitment on the part of the consumer. Specifically, known systems require the user to review and respond to dozens of questions prior to receiving an estimate of the insurance premium. Such systems make it time consuming for the customer to review a large number of e-commerce sites offering insurance products in order to comparison shop. Thus, there remains a need for a system and method capable of providing an accurate insurance quote without the burdensome and time consuming information gathering required by known systems.

SUMMARY OF THE INVENTION

Accordingly, the present invention provides a system and method capable of providing an estimated premium without extensive and repetitive questioning. The present invention utilizes unique assumptions to dramatically reduce the amount of information that must be provided by the customer. In one embodiment, existing customer data is analyzed to determine which assumptions would apply to the greatest number of potential customers. This feature of the present invention allows the system to provide an accurate quote to a large percentage of potential customers.

In one embodiment, the present invention utilizes a mainframe computer system, an application server, and an external rules management system to interact with the customer via an attractive graphic user interface. Once logged onto the website of the present invention, the customer may choose to engage in the fast quote process, if they are eligible. The fast quote process of the present invention utilizes assumptions, driver information, and vehicle information to assess the risk associated with insuring the customer and calculate an estimated cost to insure. In one embodiment, the external rules management system allows the present invention to maintain and update both the representative interface and the customer interface without interruption of customer access.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing; it being understood that the drawings contained herein are not necessarily drawn to scale; wherein:

Figures 6A, 6B:
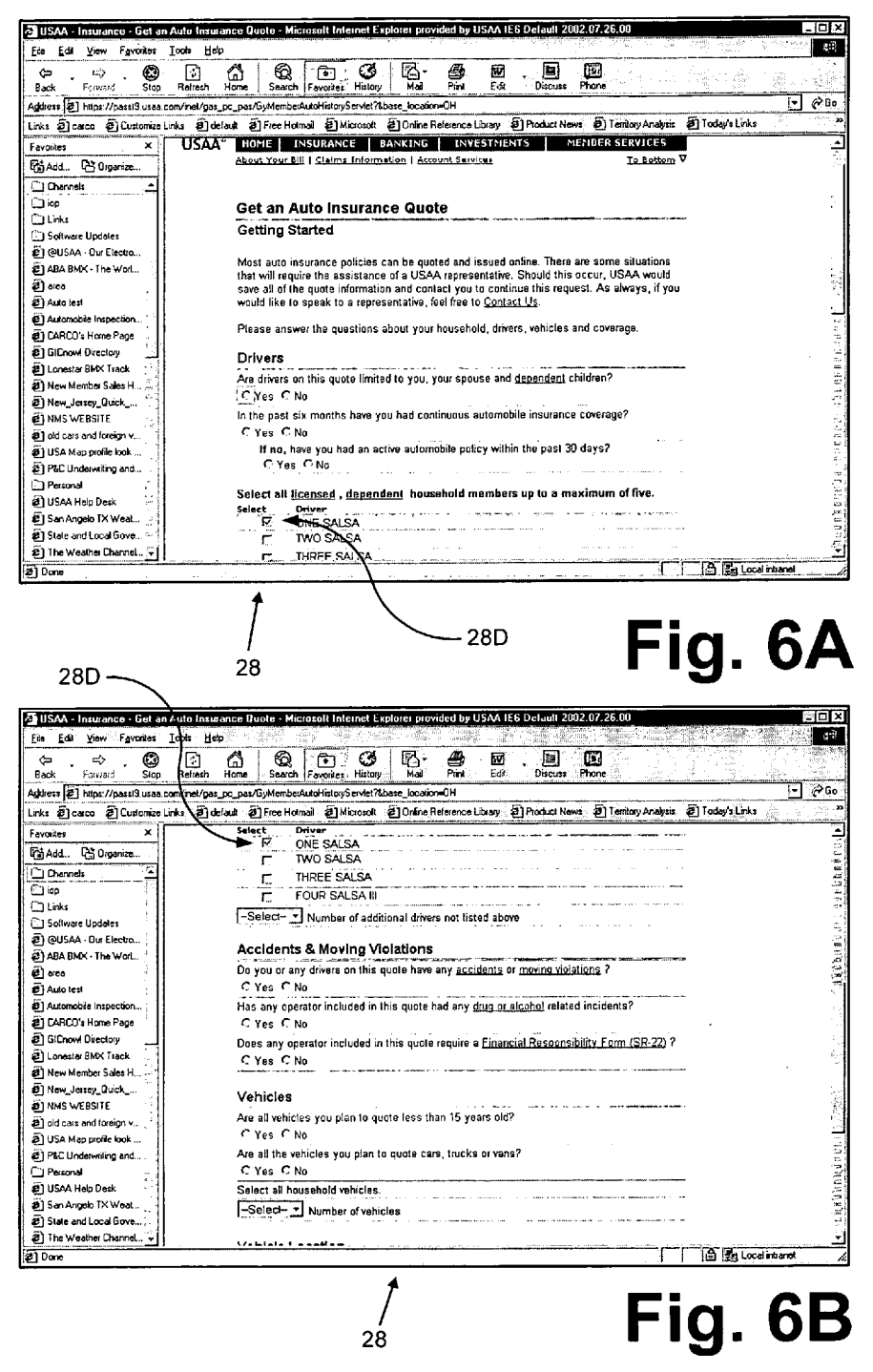
Figures 6C, 7A:
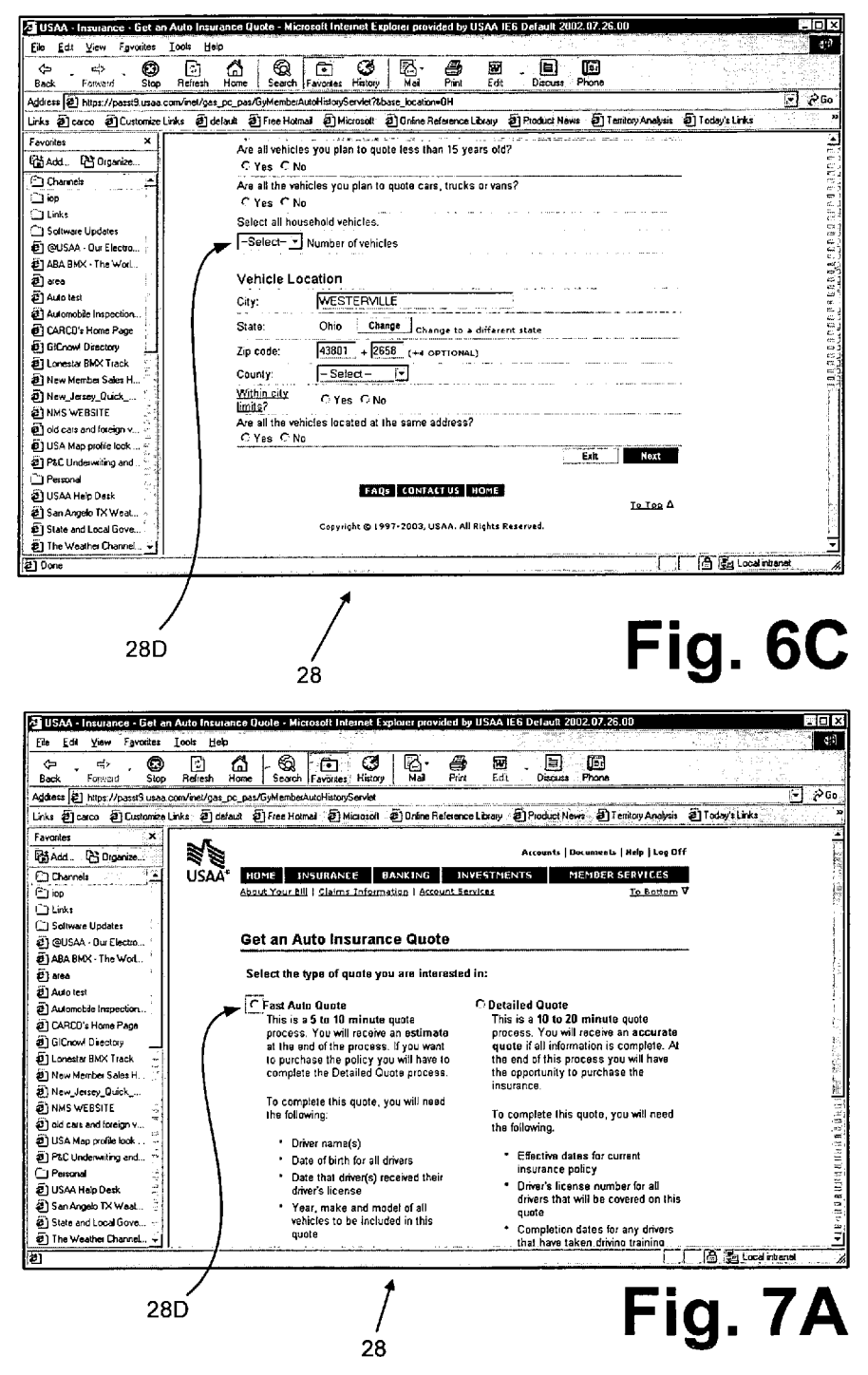
Figures 8A, 8B:
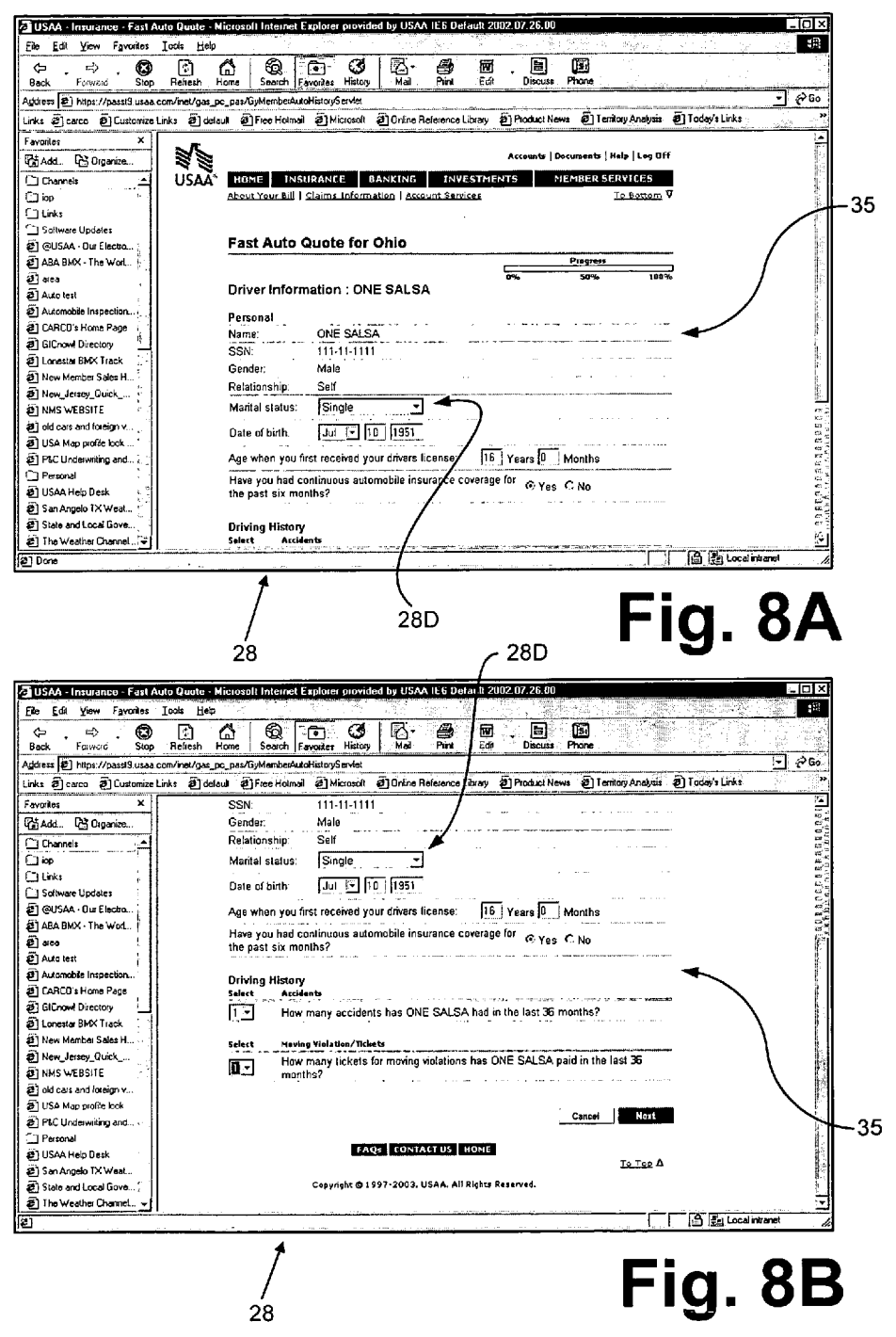
Figures 8C, 9A:
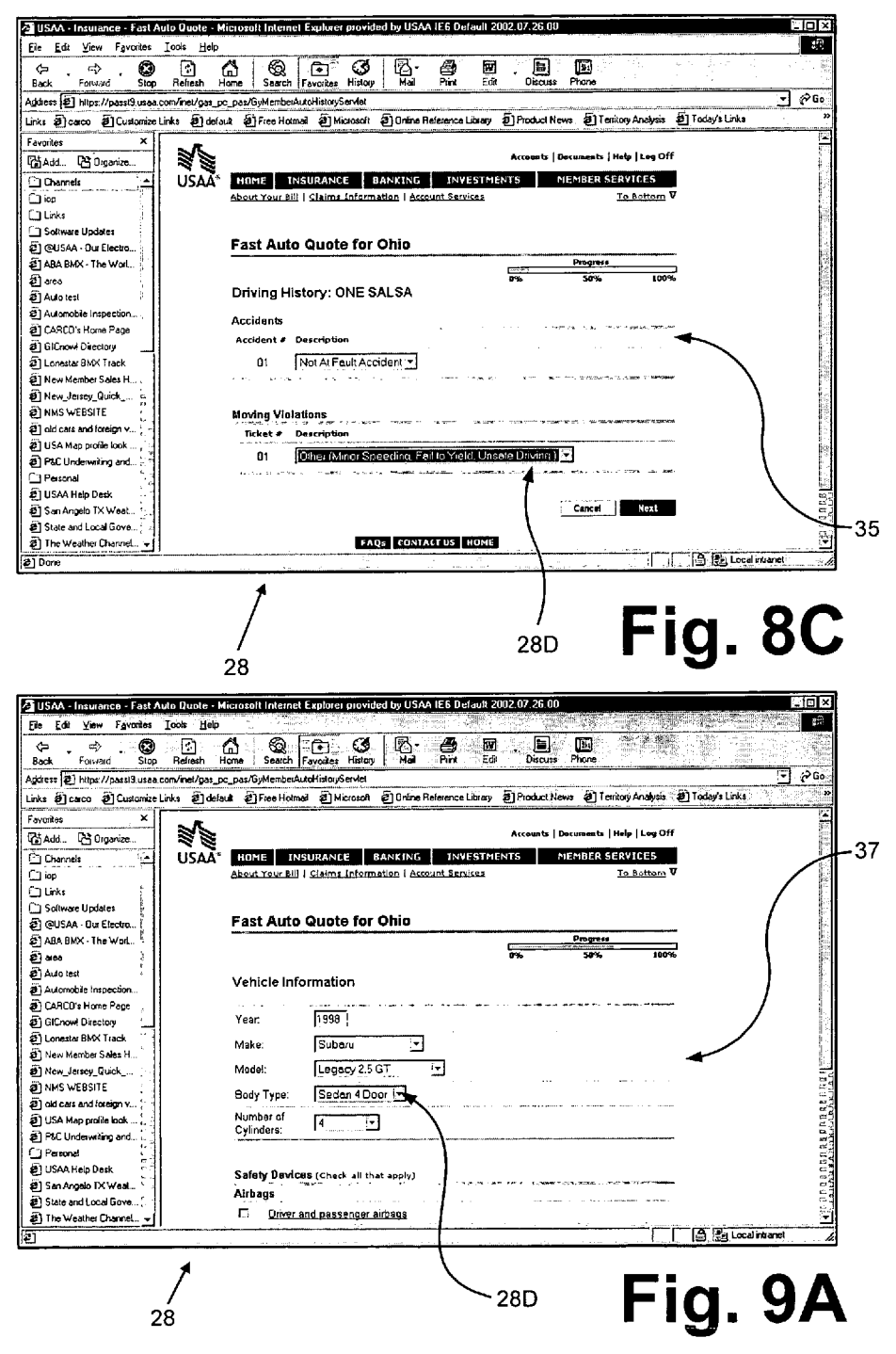
Figure 10E:
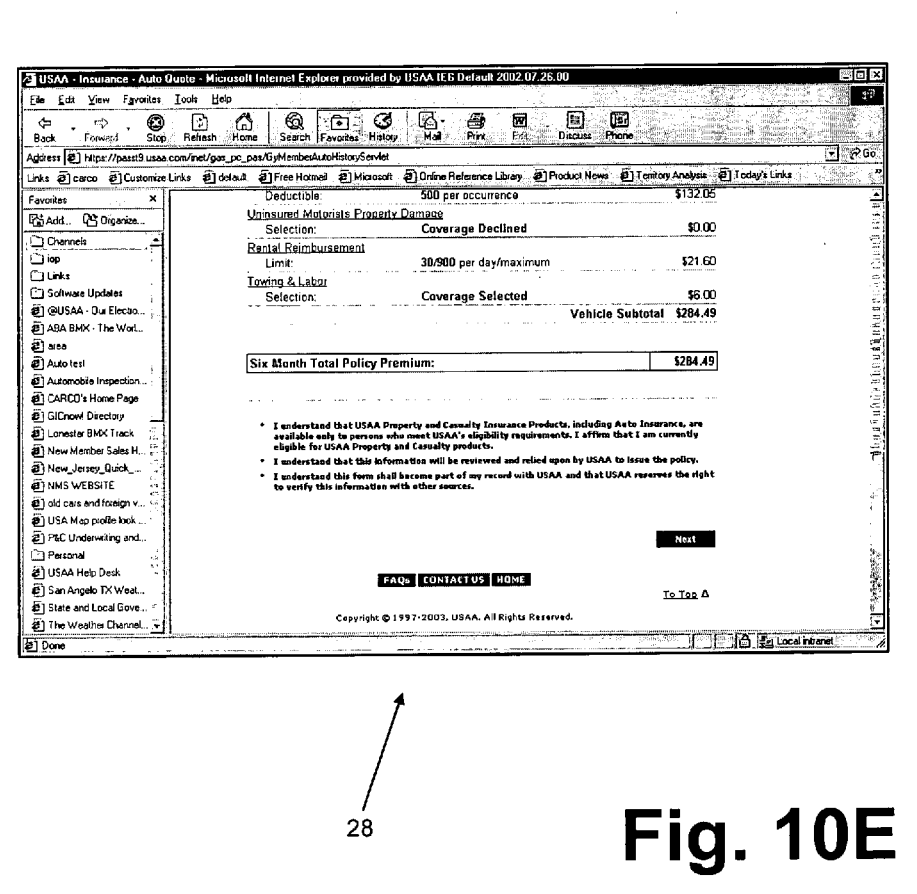

FIGS. 6A-10E are screen shots illustrating the customer graphic user interface of one embodiment of the present invention.

DETAILED DESCRIPTION OF THE INVENTION

The present invention is herein described as a method of providing pricing information and as a computer system for providing pricing information.

Figure 1:
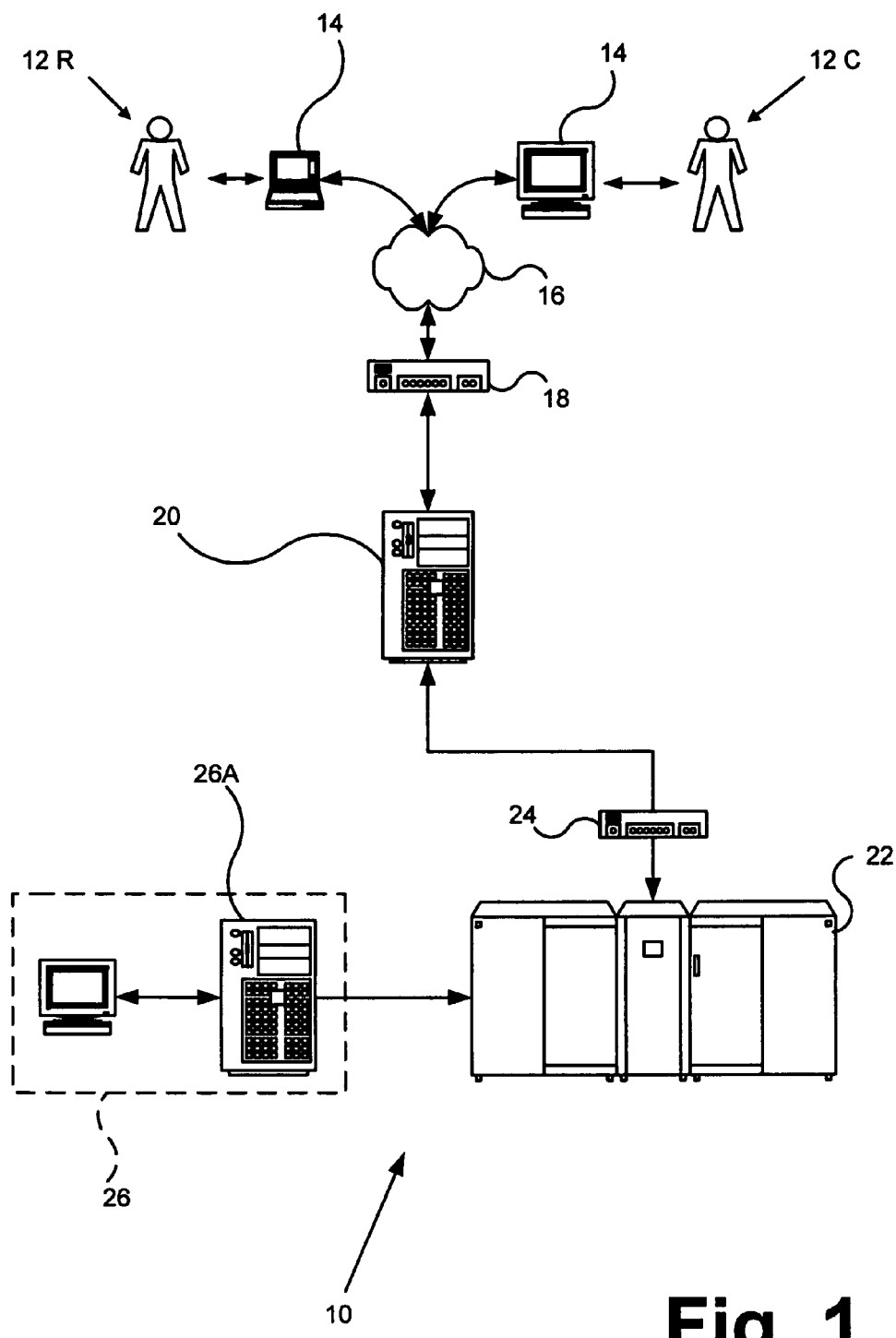
FIG. 1 illustrates a component diagram of one embodiment of the present invention.
Figure 2:
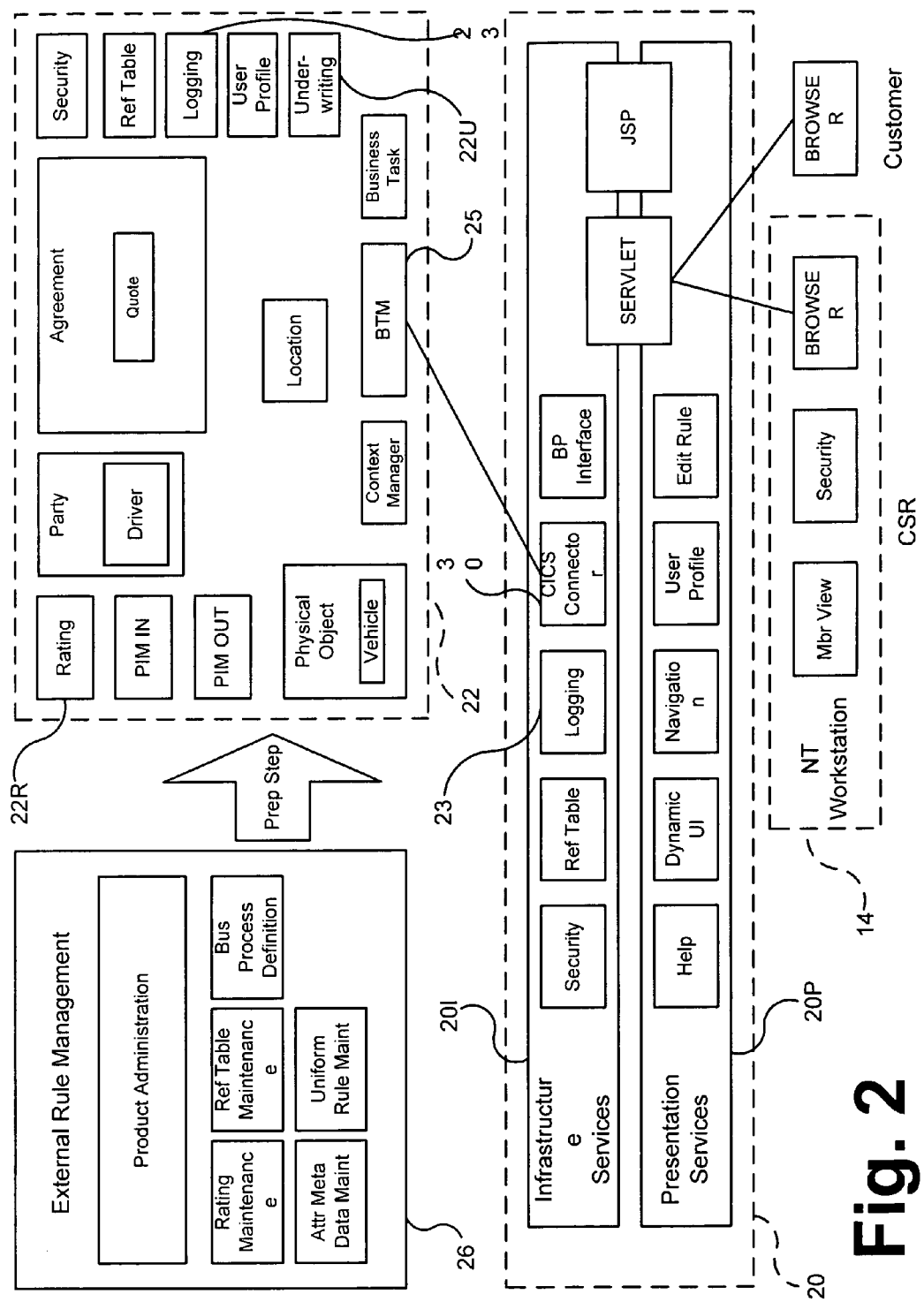
FIG. 2 illustrates the component architecture design of one embodiment of the present invention.

Referring to FIGS. 1 and 2, the present invention comprises a system (10) capable of interaction with one or more customers (12C) for the purpose of transacting e-commerce. In one embodiment, the present invention is ideally suited to provide insurance products. The customer (12C) may utilize a remote computer system (14), such as a personal computer or laptop, to connect with the present invention via a computer network (16).

In one embodiment, the computer system of the present invention comprises an application server (20) designed to interact with one or more remote systems. Specifically, by accessing a URL address through a computer network such as the internet, the customer may be granted access to, and transact business, using the present invention. Security infrastructure is utilized to provide security to the system against unauthorized access and/or harmful viruses. In one embodiment, a firewall (18) positioned between the application server (20) and the computer network (16) is utilized for this purpose.

The application server (20) of the present invention is capable of managing the customer's interaction with the system. In one embodiment, an Advanced IBM Unix/websphere application server is utilized. In another embodiment, web server technology such as a server farm of Intel Pentium 4/MS Windows servers running Microsoft's IIS, or a Sun Microsystems E10000/Solaris running IBM's websphere or BEA's web logic servers is utilized by the present invention to facilitate customer interaction.

Referring also to FIG. 2, the application server (20) is equipped with presentation and infrastructure service components (20P and 20I, respectively). The presentation service components (20P) of the application server are designed to manage the graphic user interface (28) of the present invention and assist the user with navigation.

Referring to FIGS. 6A-16, the graphic user interface of the present invention is viewable by either the customer (12C) or the customer service representative (12R). In one embodiment, different JAVA server page (JSP) templates are utilized by the application server (20) to build and display the interface (28) seen by the customer (12C) versus the interface seen by the representative (12R). In another embodiment, the representative interface is designed to be substantially similar, i.e., look and feel, to the interface available to the user.

By providing the customer service representative with an interface substantially similar to the customer's interface, the system allows the customer service representative to better assist the customer through the fast quote process. In one embodiment, the customer interface provides navigation links at the top of the browser pages. It being understood that both interfaces provide data entry and selective fields (28D) for use by all users.

The present invention provides customer service representatives with customer information, if applicable, at the top of the screen, along with intelligent online procedures (IOP) and help links on the side of the interface. Thus, although the look and feel of the customer and customer service representative screens are similar, the customer service representative is provided with additional information useful in assisting the customer. In one embodiment, this information may include city/county information (84), consumer report information (86), incentive information (88), supplementary vehicle information including make, model, airbags, and daytime running lamps (90), risk profile information (92), coverage information (94), and methods of payment (98). Selected screen shots of the customer interface are illustrated in FIGS. 6A-10E while selected screen shots of the representative interface are illustrated in FIGS. 11-16.

Referring back to FIGS. 1 and 2, in one embodiment, metadata is utilized by the application server (20) to render display enhancements, such as labels, which may be different for the customer and service representative screens. Further, the application server may be equipped with a storage device (23) for storing and maintaining electronic information useful for the presentation upon the graphic user interface. In one embodiment, the application server storage device may be utilized to store driver and vehicle information provided by the customer.

The infrastructure service components (20I) of the application server provide various security features as well as a CICS connector (30) capable of sending and receiving requests to the mainframe system (22), as described further below. In one embodiment, the infrastructure service component (20I) of the application server (20) contains at least one storage device.

In one embodiment, the present invention provides a mainframe system (22) having at least one storage device (23) for storing electronic data. The mainframe system is coupled to the application server (20) such that information may pass therebetween. Both the application server and the mainframe system maybe equipped with multiple storage devices. For example, each component shown in FIG. 2 may be equipped with its own corresponding memory unit. In one embodiment, the mainframe system is equipped with a rating engine (22R) and an underwriting engine (22U).

The underwriting engine of the present invention allows the system to provide an insurance quote to a customer regardless of the risk to insure. Specifically, the underwriting engine has been incorporated into the mainframe system (22) of the present invention such that it may be directly accessed by the system in response to a customer quote request. Thus, the system provides an automated risk assessment through the underwriting engine as if the customer were physically present with a customer service representative. In short, the underwriting engine determines which risk code should be assigned to the customer given their state of residence, and other information unique to the customer at time of quote.

The use of unique assumptions by the present invention allows the underwriting engine (22U) to assess the risk associated with insuring the customer as quickly as possible. Specifically, the underwriting engine utilizes the assumptions in conjunction with the driver and vehicle information (35 and 37, respectively) provided by the customer. In this way, the system dramatically reduces the number of questions that the customer must respond to in order to be given an accurate quote.

Once the risk has been assessed, the risk code provided by the underwriting engine is utilized by the rating engine (22R) to calculate an insurance quote for the customer. In one embodiment, the mainframe system (22) of the present invention utilizes Ratabase® software to calculate the estimated price. This quote is then presented to the user via the graphic user interface (28) provided by the application server.

In addition to the above, the mainframe system is also equipped with various business components, storage device (s), task management components, and infrastructure components as illustrated by FIG. 2. In one embodiment, the task manager (25) provided by the mainframe system (22) is equipped with software capable of receiving and interpreting signals provided by the application server. In short, the task manager is designed to process information from the server and direct the tasks that contact and activate specific business services held upon the mainframe storage device(s). This allows the graphic user interface of the present invention to retrieve and display any information held upon the mainframe system upon request.

It should be understood that the present invention may utilize any number of hardware components and that the present invention is not limited to those explicitly described herein. For the purposes of illustration only, the mainframe system utilized by the present invention may be an IBM S/390 mainframe system. In one embodiment, the application server (20) is coupled to the mainframe system (22) via a CICS connector (30). It being understood that the mainframe system (22) may be equipped with security infrastructure such as an external vendor firewall (24) to provide additional security against unauthorized access.

In one embodiment, the present invention provides an external rules management system (26) operable in conjunction with the mainframe system (22). Specifically, the external rules management system is designed to update and maintain information held upon the mainframe system. In one embodiment, the rules management system is an offline computer system (26A) capable of receiving new information or changes that may then be passed to the mainframe system at regular intervals.

This feature of the present invention allows the mainframe system to be continually updated without interruption of the online customer process. Such maintenance and/or updates may take the form of new or amended products, changes to applicable federal or state regulations, amendments to metadata information applicable to the graphic user interface, etc. The external rules management system allows changes to be made to both the customer interface and the customer representative interface simultaneously. Amendments and/or changes may be tested to ensure compatibility prior to submission to the mainframe system (22) such that no interruption in online function is required.

Figure 3:
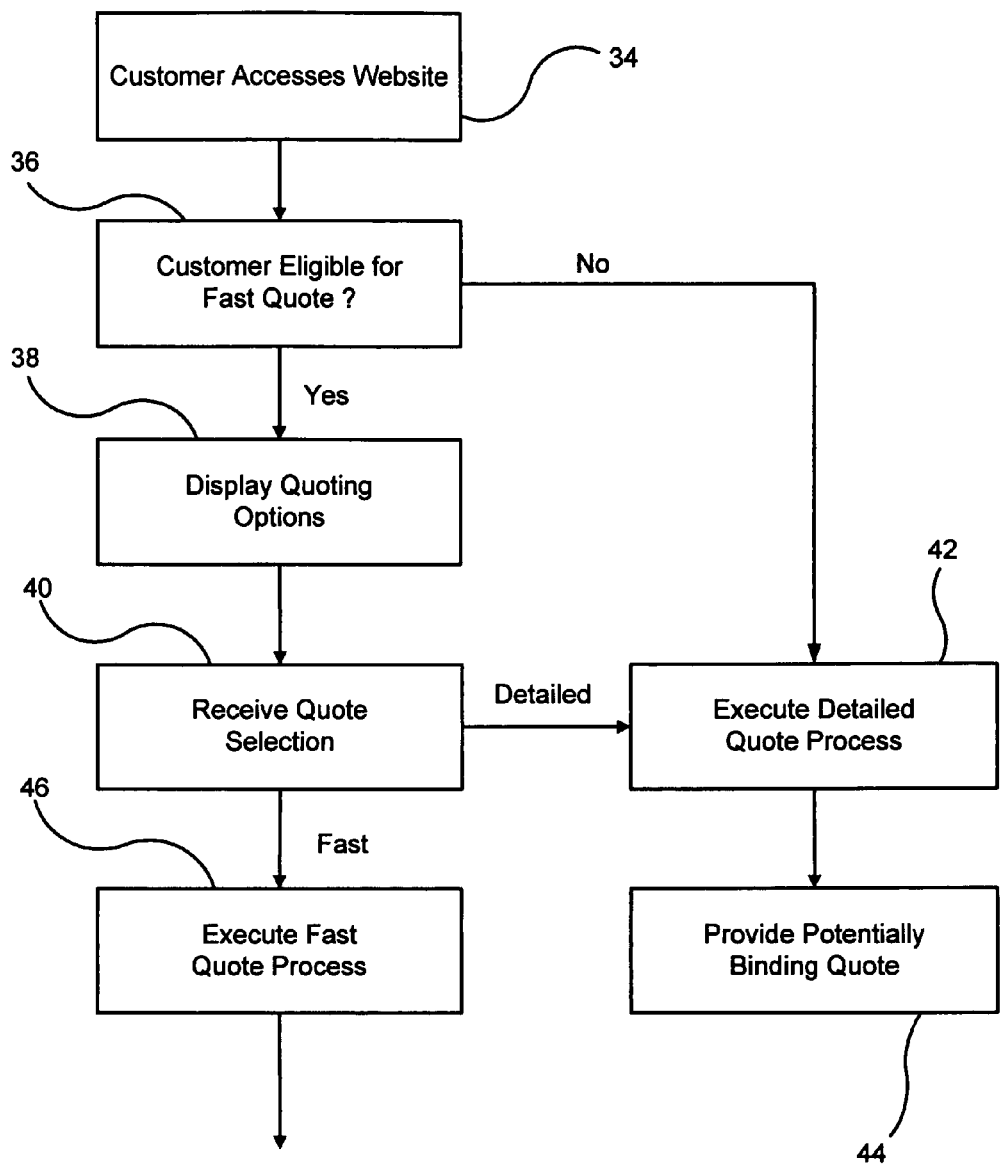
FIGS. 3-5 are process flow diagrams illustrating the fast quote process of one embodiment of the present invention.
Figure 4:
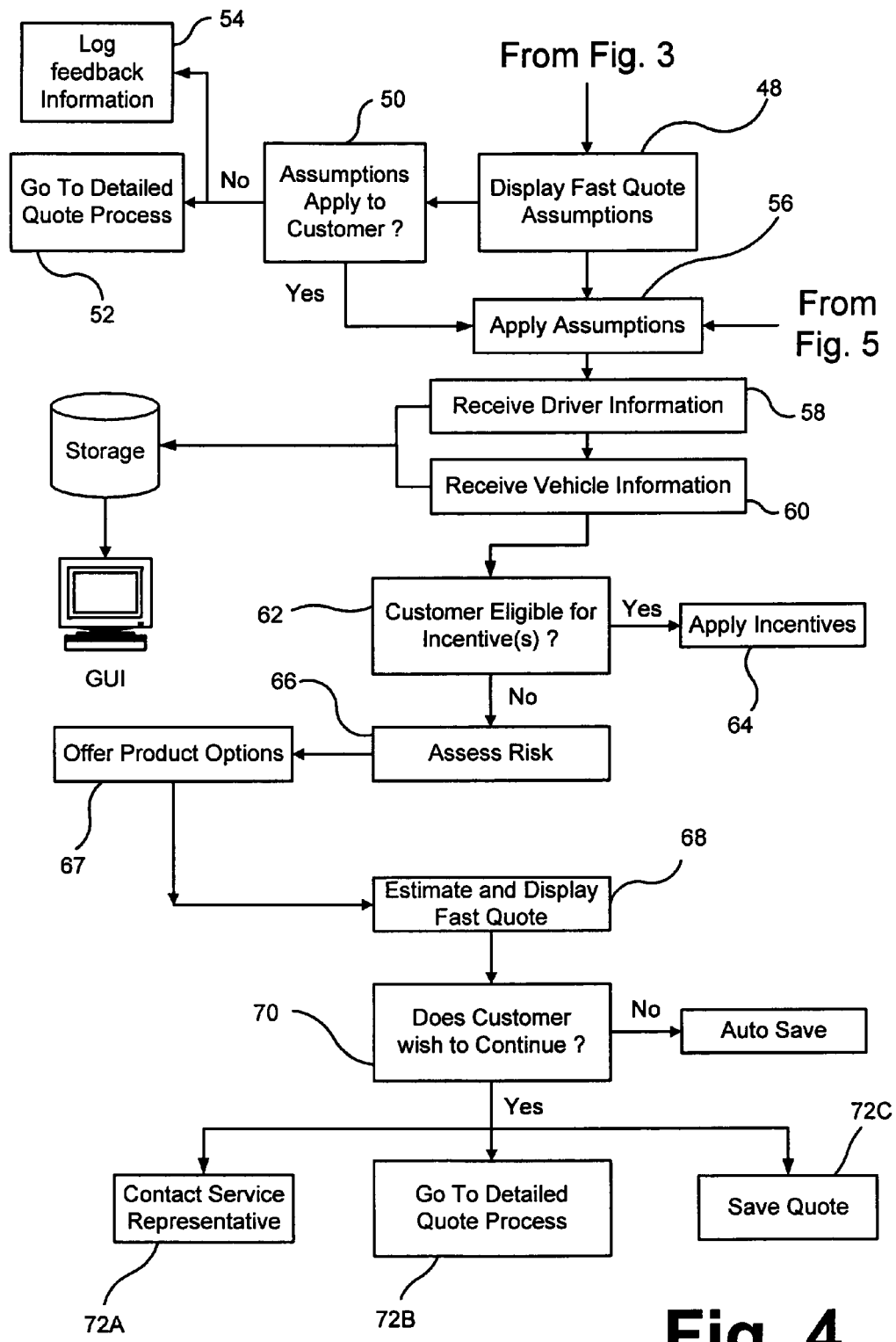
Figure 5:
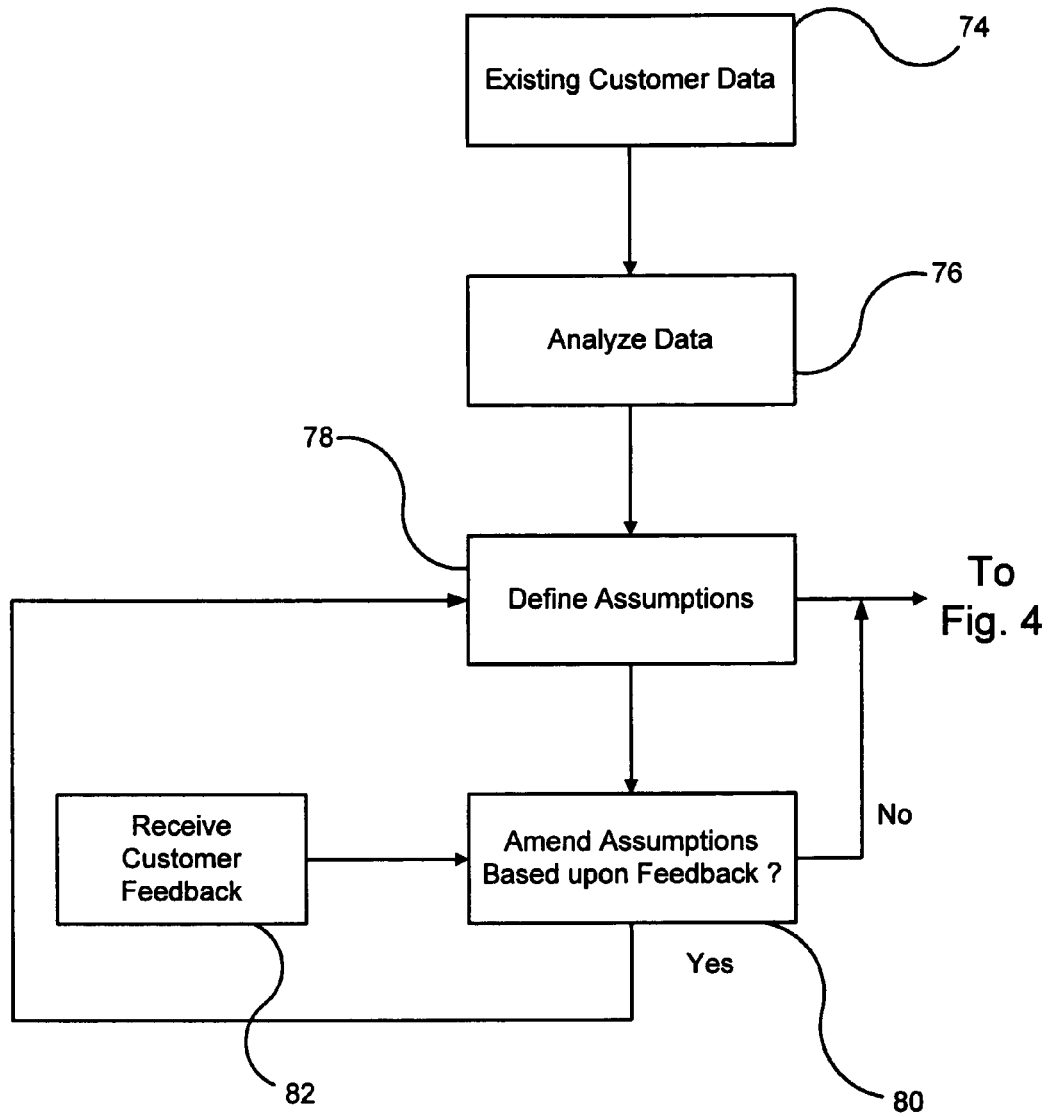
Figure 7B:
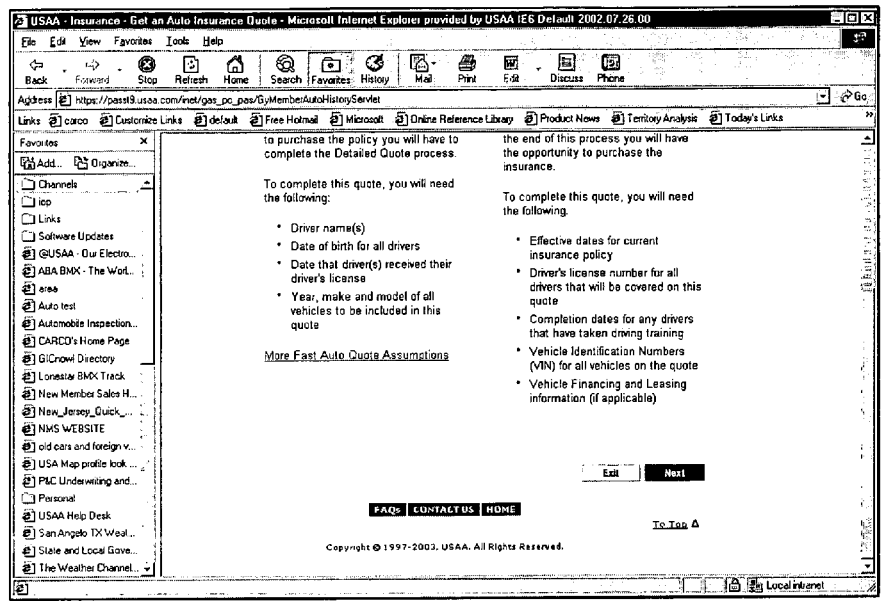
Figure 7C:
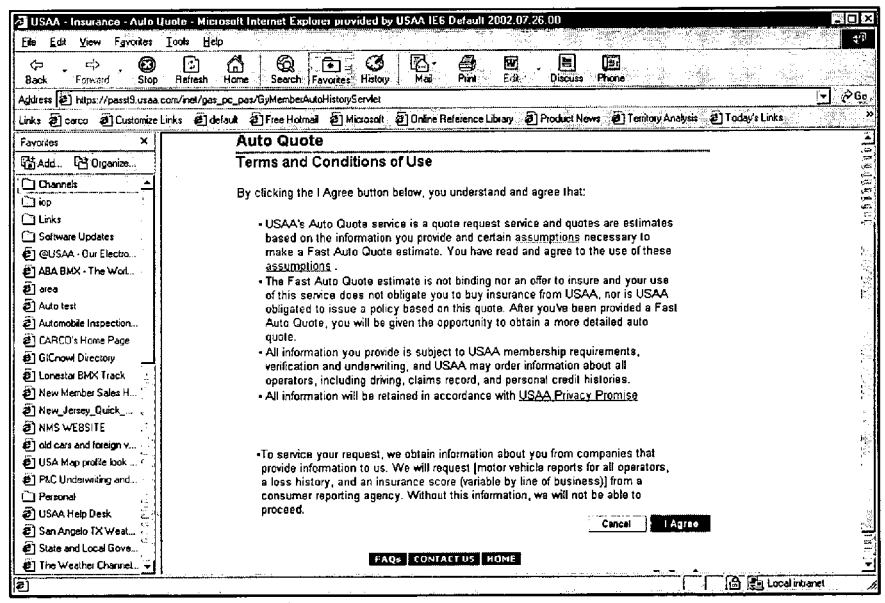
Figure 9B:
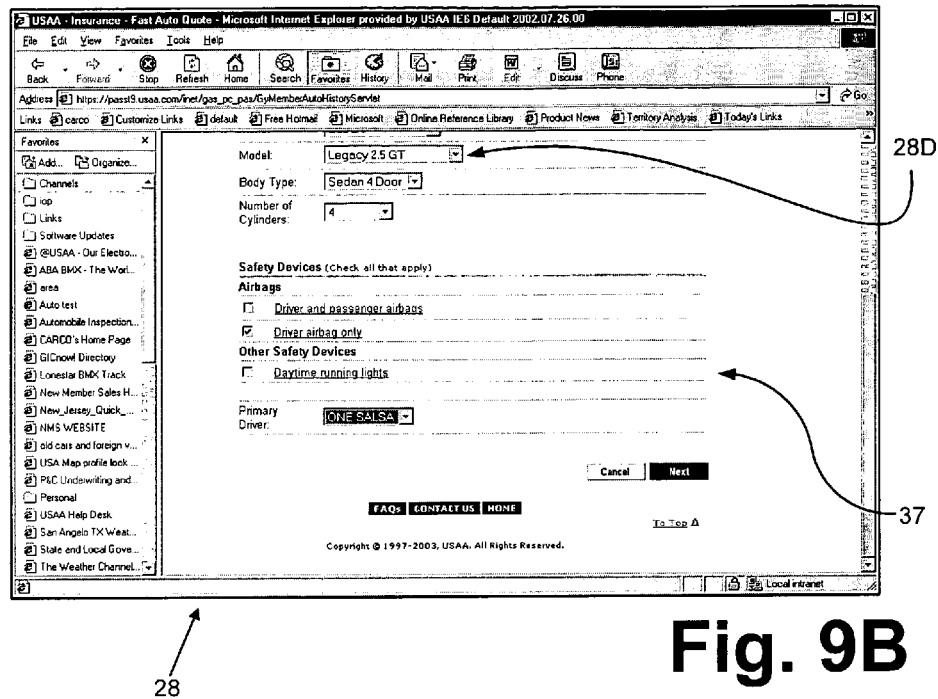
Figure 9C:
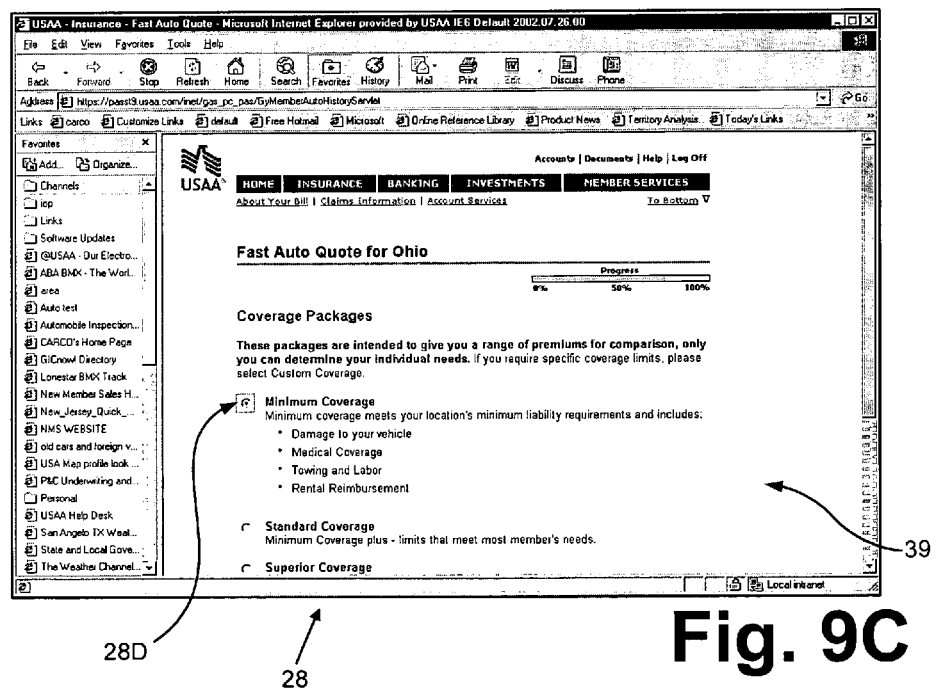
Figure 9D:
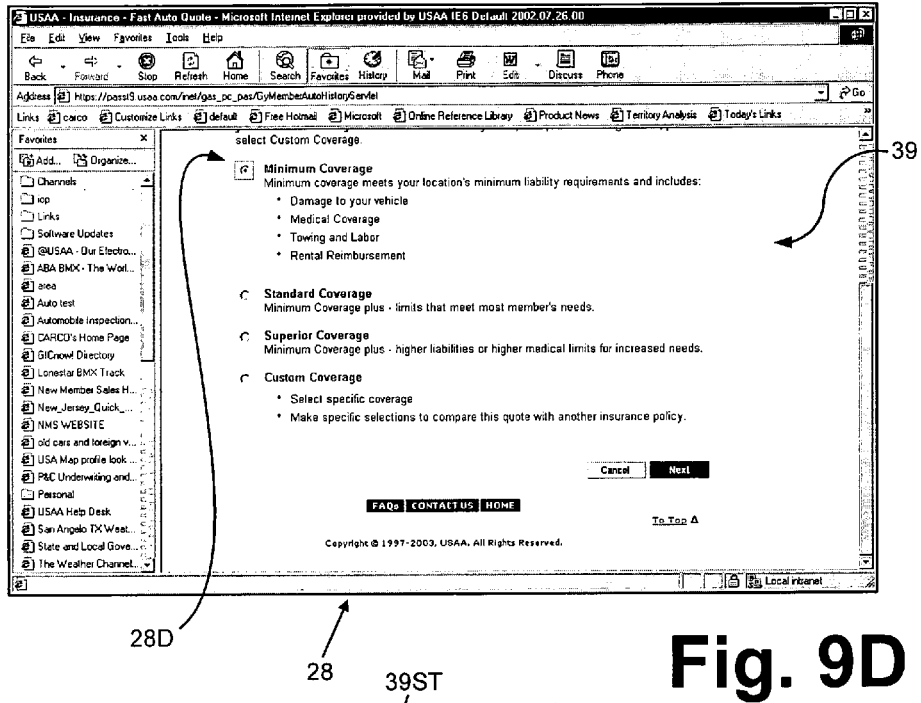
Figure 9E:
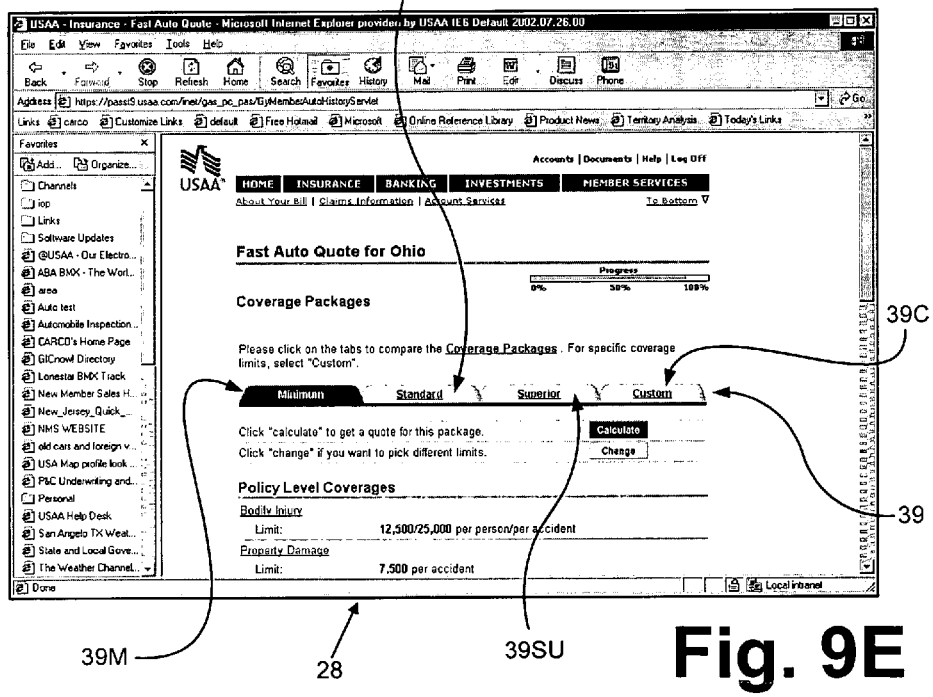
Figure 9F:
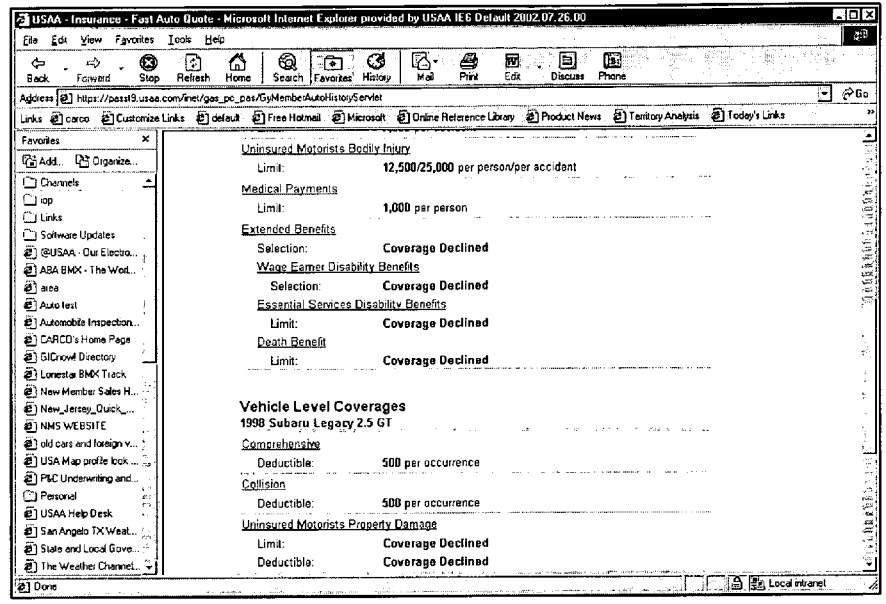
Figure 9G:
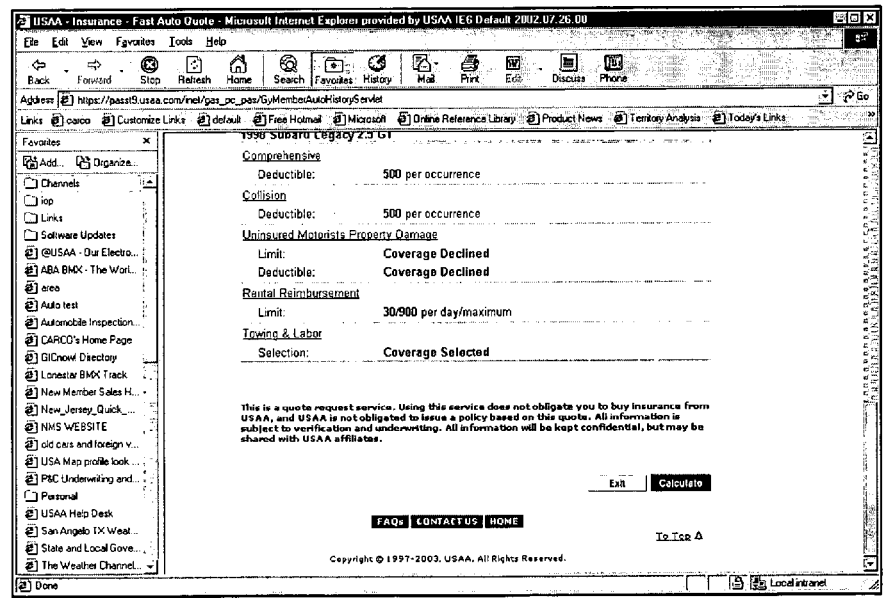
Figure 10A:
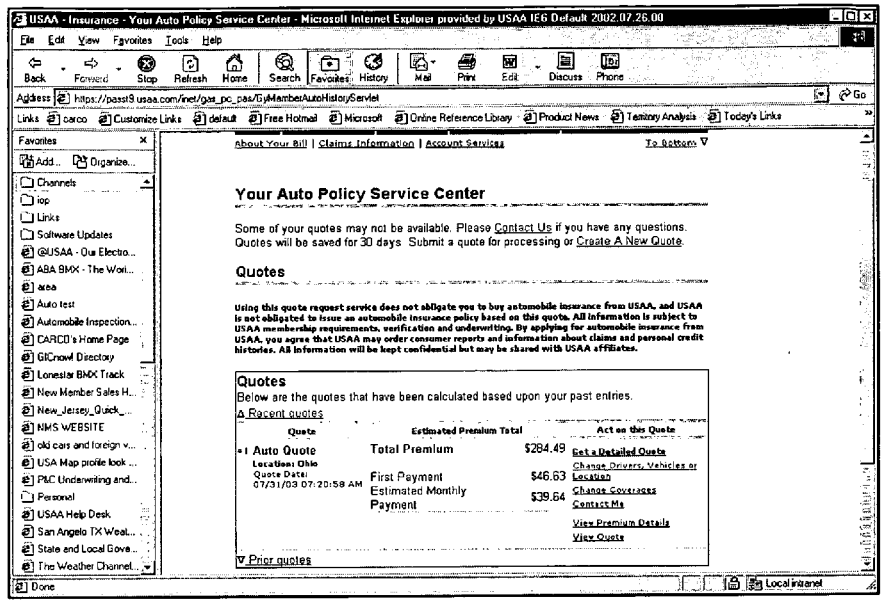
Figure 10B:
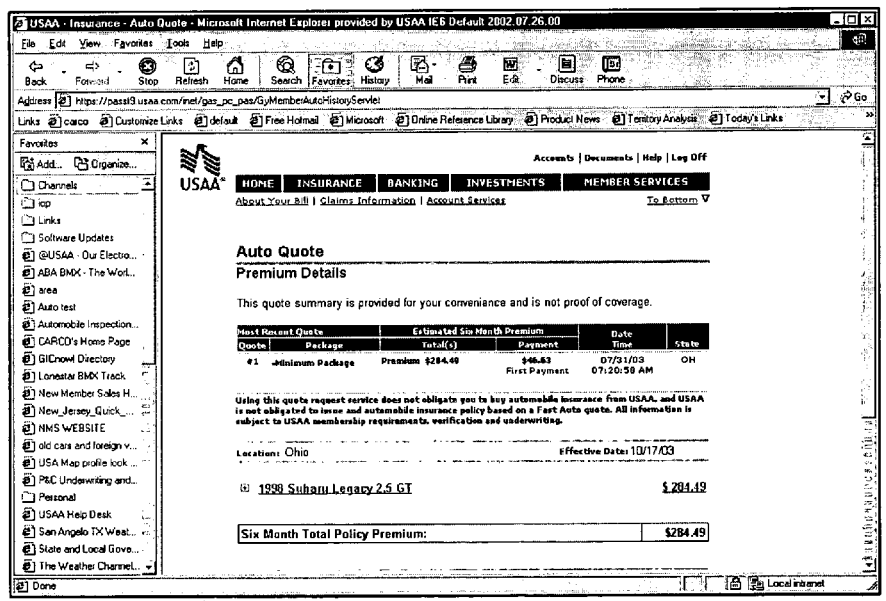
Figure 10C:
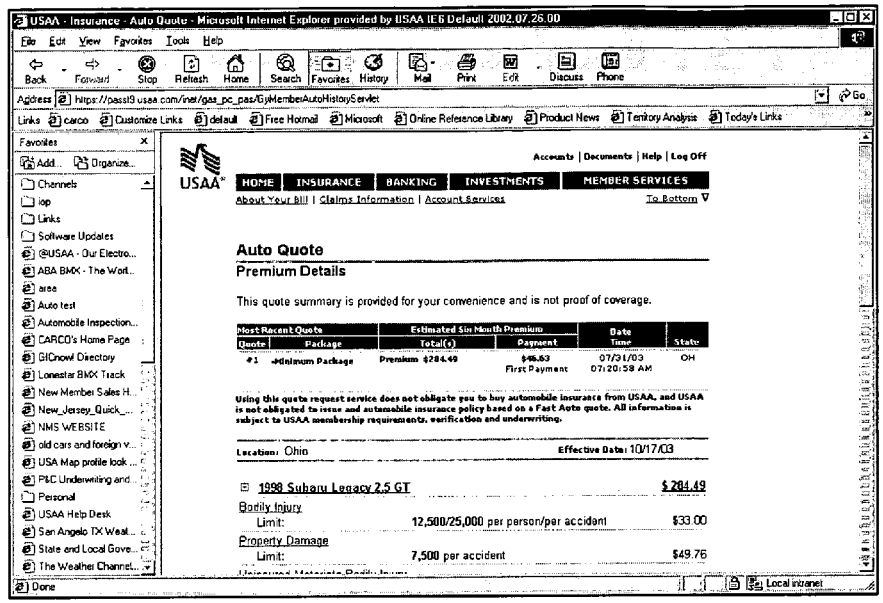
Figure 10D:
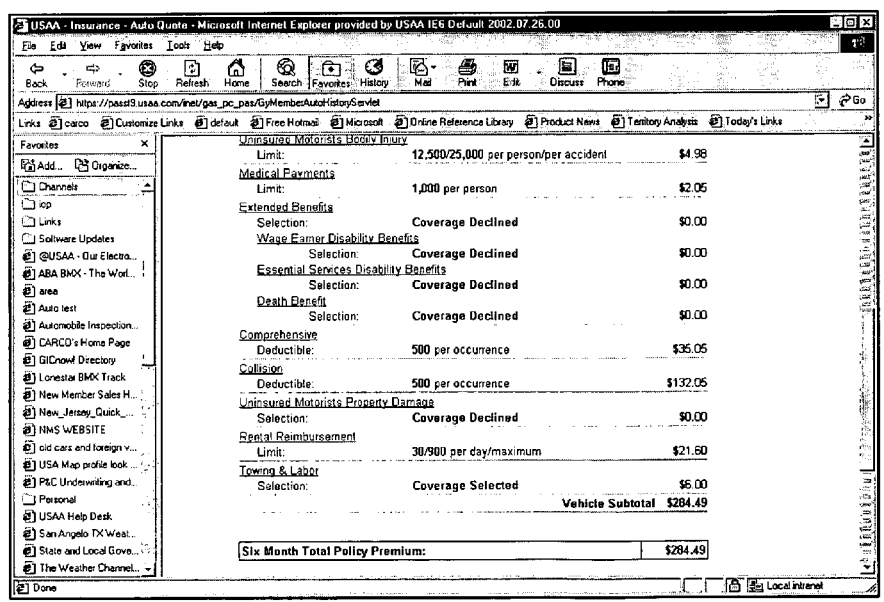
Figure 11:
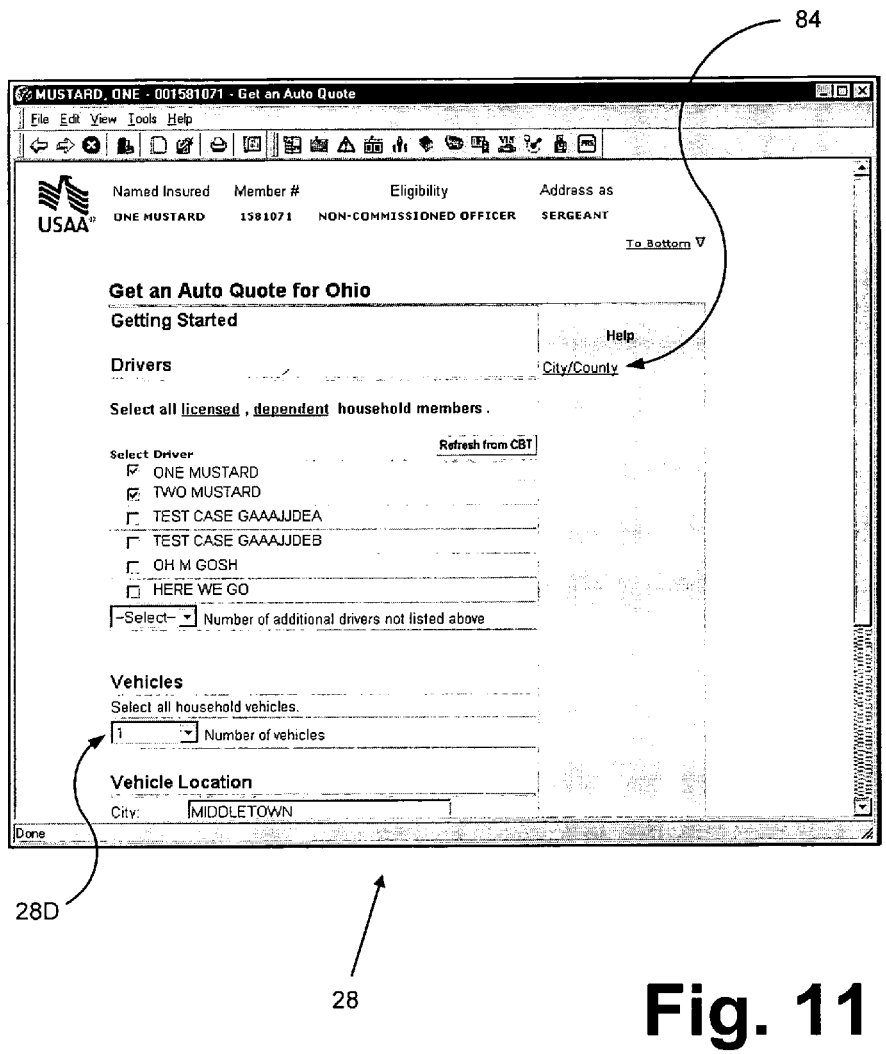
FIGS. 11-16 are screen shots illustrating the customer service representative graphic user interface of one embodiment of the present invention.
Figure 12:
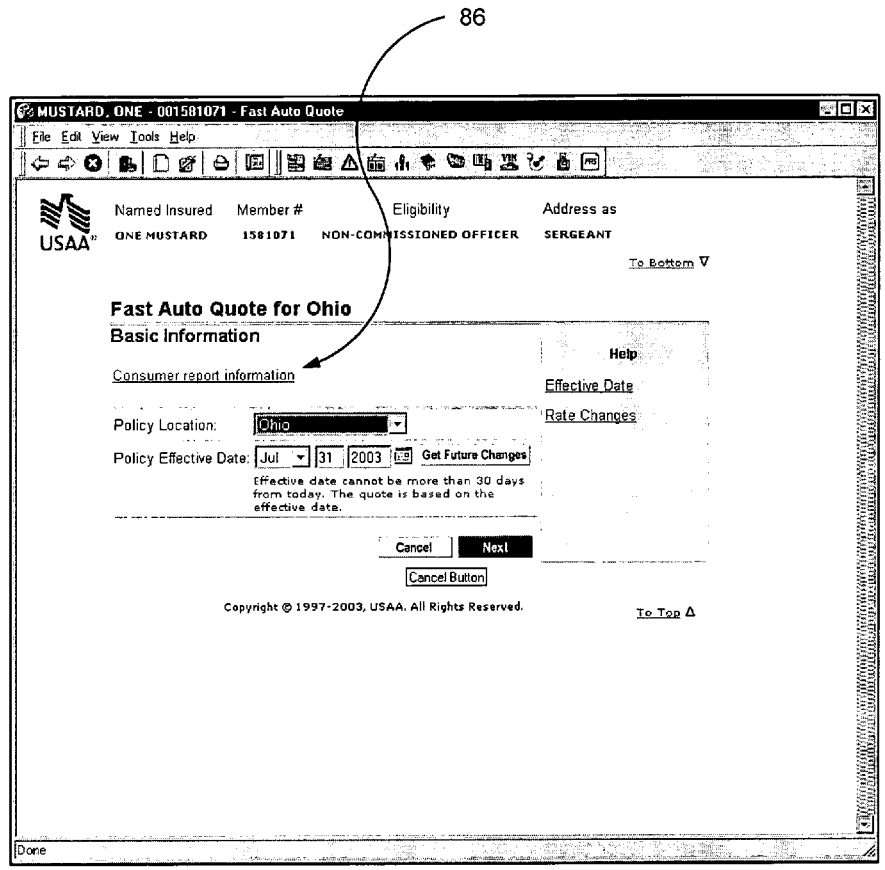
Figure 13:
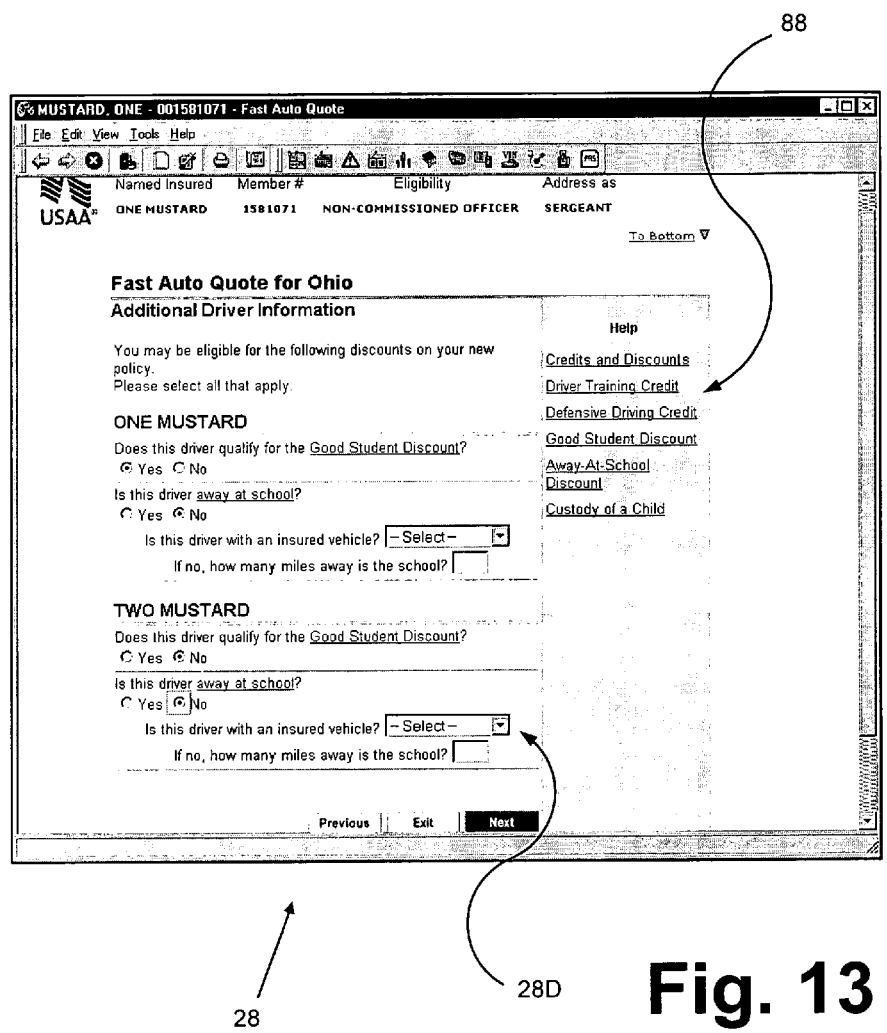
Figure 14:
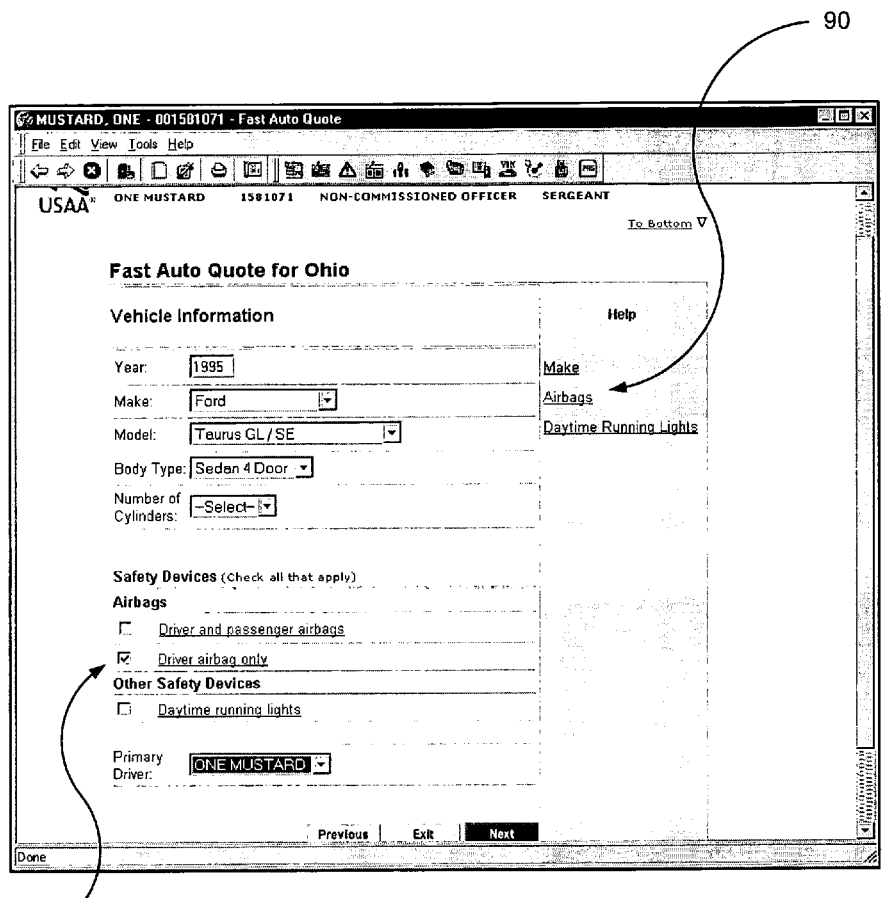
Figure 15:
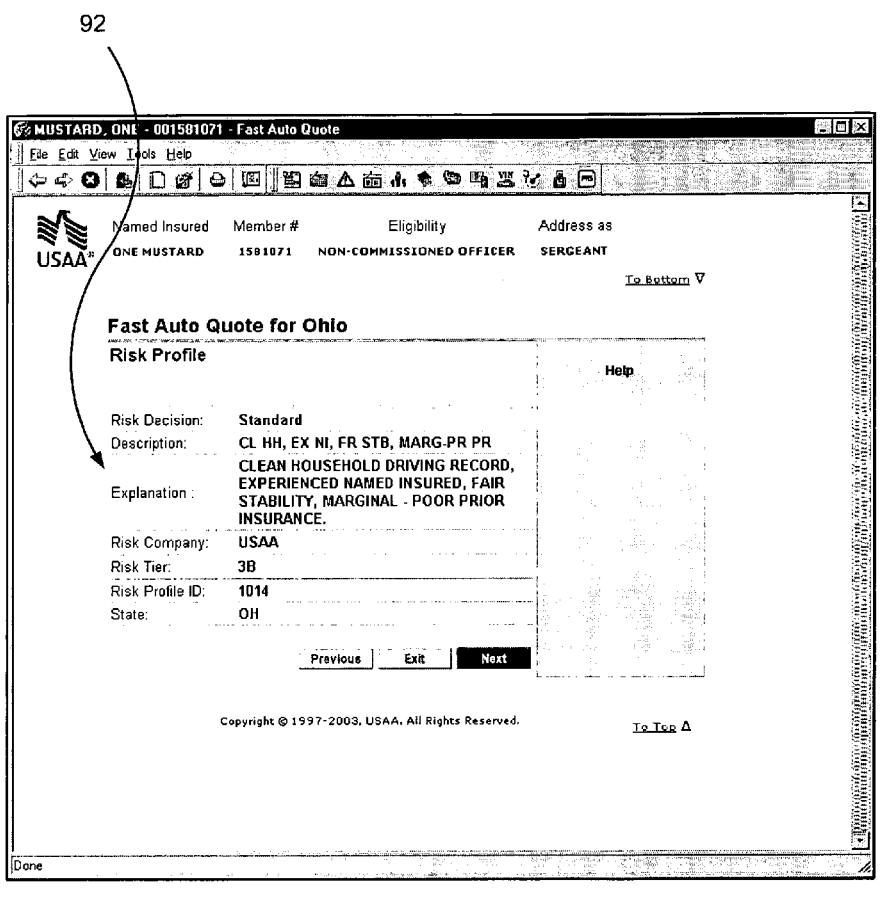
Figure 15A:
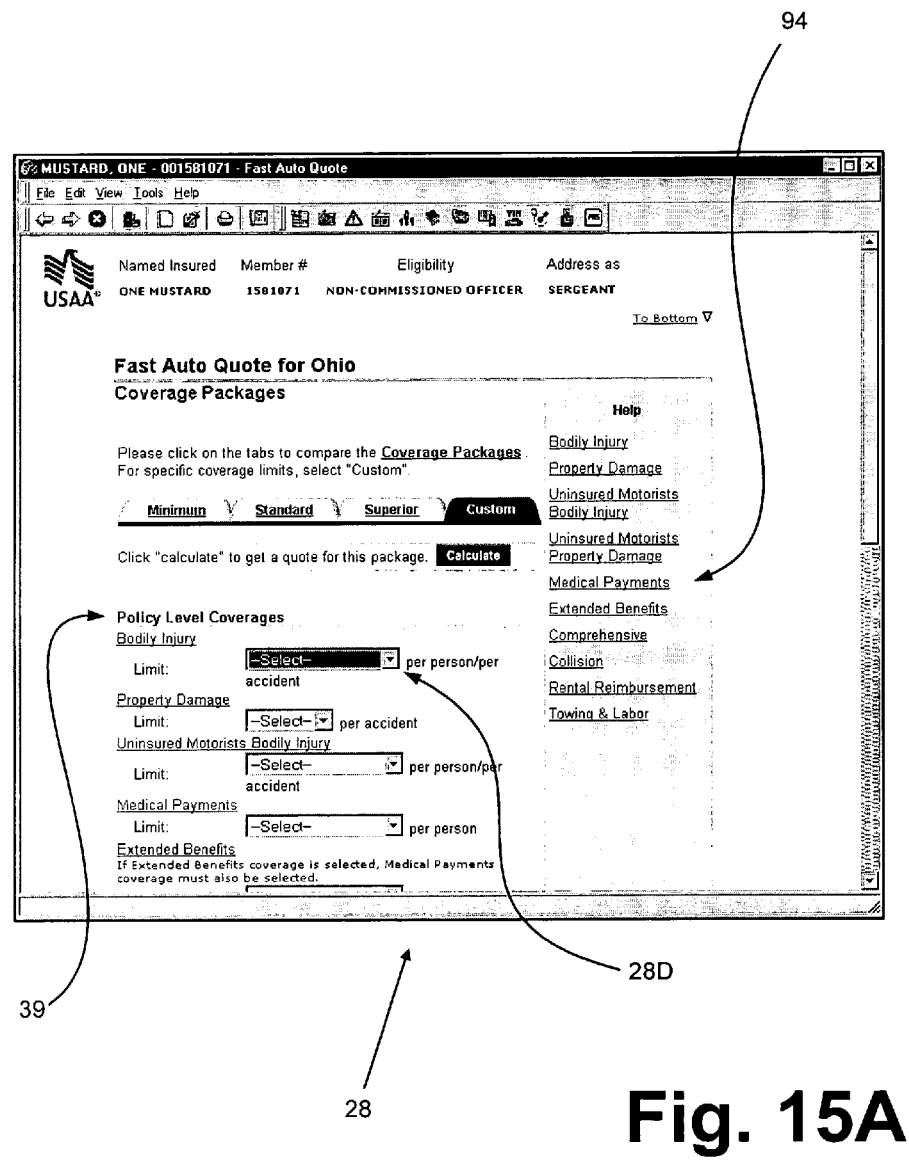
Figure 15B:
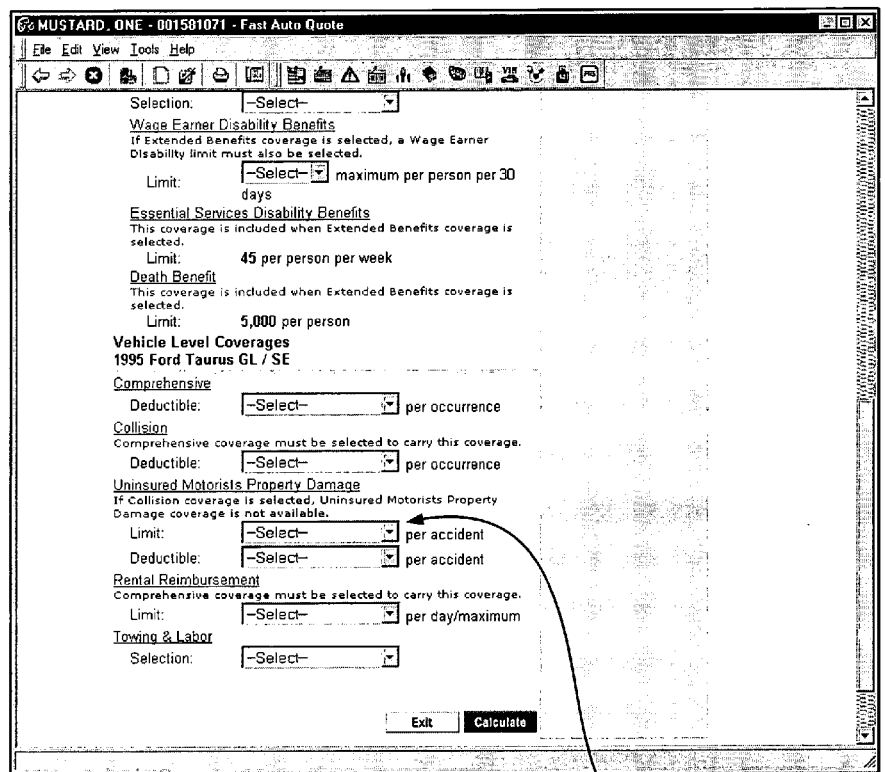
Figure 16:
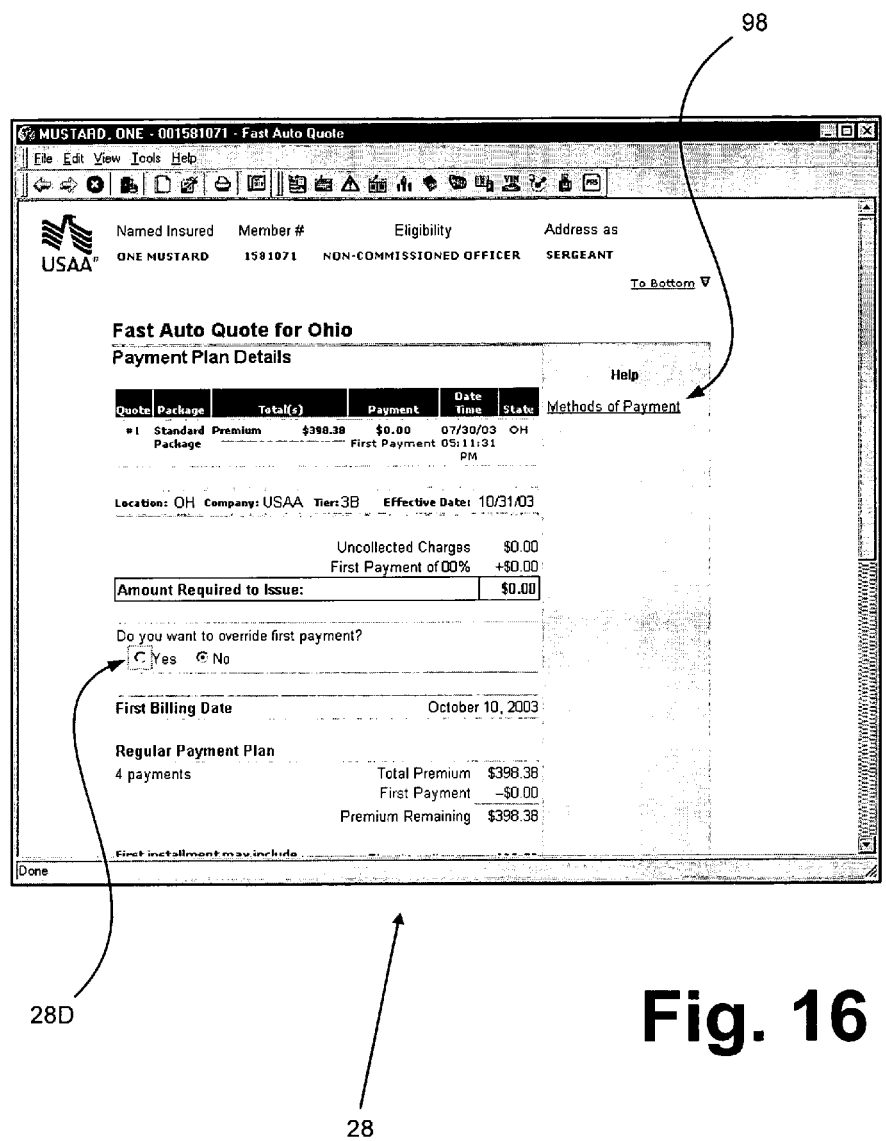

Referring to FIGS. 3 through 5, in one embodiment, the customer (12C) may utilize the remote computer system (14) to connect with the present invention through the computer network (16), as illustrated by Box 34. At this time, the customer is presented with a limited number of questions designed to determine whether the customer is eligible for the fast quote process, as illustrated by Box 36. For example, a few states do not allow insurance companies to provide non-binding estimates to the customer. Thus, it is necessary to determine the state of residence for the customer at issue. If the customer is determined to be unacceptable for the fast quote process, the present invention automatically provides a detailed quote process for the customer's use, as described further below.

If the customer is acceptable for the fast quote process, the present invention will provide an overview of the customer's choices, as illustrated by Box 38. Specifically, the customer is provided with explanation of both the detailed quote process and the fast quote process and is requested to enter a preference with regard to which process will be executed. Referring to Boxes 40, 42, 44 and 46, once received, the customer's preference is noted and the preferred quoting process is begun for the customer's benefit.

Referring to FIGS. 4 and 6A-16, upon selection of the fast quote process option, the present invention displays a listing of assumptions to be made by the system, as illustrated by Box 48. In one embodiment, the present invention requests that the customer confirm that each assumption being made is applicable, as illustrated by Box 50. In one embodiment, the assumptions made by the present invention include good credit, active driver's license, no vehicle value over $80,000.00, vehicular usage limited to 12,000 miles for work/school, and/or all vehicles built according to applicable federal and state laws of the United States.

If the customer confirms the assumptions, they are applied by the system, as illustrated by Box 56. However, if the customer does not confirm that the assumptions are correct, the system cancels the fast quote process and, instead, provides the first graphic user interface screen for the detailed quote process, as illustrated by Box 52. In one embodiment, "feedback information" relating to the assumptions is logged for future reference, as illustrated by Box 54.

In addition to application of the assumptions, the customer is queried for driver information (35) including, but not limited to, the number of drivers to be insured, previous insurance coverage, driver identification, and/or driver history, as illustrated by Box 58. Further, the system queries the customer to provide vehicle information (37) including, but not limited to, vehicle location, the number of vehicles being insured, make and model of each vehicle, and/or vehicle safety devices present, as illustrated by Box 60. Driver and vehicle information may then be stored for later review/use.

In one embodiment, the present invention utilizes one or more remote information sources to obtain all or a part of the customer's vehicle and/or driver information. Such information sources may include, but are not limited to, data services such as the customer's Motor Vehicle Report (MVR) and the Comprehensive Loss Underwriting Exchange (CLUE). This feature of the present invention further reduces the amount of information that the customer must provide in order to receive a price quote. In one embodiment, such information may be retrieved electronically via a computer network.

The present invention is also capable of providing the customer with various product packages (39), as illustrated by Box 67 of FIG. 4. In one embodiment, such packages may include a minimum package covering the minimum liability requirements of the customer's home state, a standard package providing insurance limits that satisfy a majority of customers, a superior or maximum package providing the customer with increased and/or maximum available liabilities and/or medical limits, or a custom package wherein the customer may enter specific values he or she wishes to obtain. In one embodiment, the present invention provides various coverage options using attractive tabs positioned upon the graphic user interface.

In one embodiment, the customization capability of the present invention allows the user to copy product features associated with an existing product package and then enter customized values. For example, if Customer "A" wishes to receive a quote for the minimum package but wants to increase the amount of bodily injury coverage, he or she may simply select the change button on the minimum package display screen to do so. This feature of the present invention allows the customer to obtain a price quote for a preferred product package without entering each and every coverage amount.

In one embodiment, the present invention utilizes the driver information and/or vehicle information to determine if an incentive, including discounts, promotions, or any other benefit to the consumer, is applicable, as illustrated by Box 62. Such an incentive may be applied to the quoting process by the present invention, as illustrated by Box 64. In one embodiment, the present invention maintains and stores a table of incentive rules defining which type of customer may be offered an incentive. In one embodiment, the incentive rules table is arranged so as to cross reference each available incentive with driver and/or vehicle information provided by the customer so that such incentives may be offered to the customer.

Once the assumptions have been applied, driver and vehicle information are analyzed to 1) assess the risk associated with insuring the customer at issue, and 2) calculate an estimated price to insure the customer given the information provided, as illustrated by Box 66. The resulting quote, may then be displayed upon the graphic user interface (28), as illustrated by Box 68.

At this time, the customer is given several options as to how he or she would like to proceed, as illustrated by Boxes 70, 72A, 72B, and 72C. In one embodiment, the customer may wish to proceed to the detailed quote process in order to receive a potentially binding quote and ultimately purchase the insurance product. The detailed quote process is also conducted online but takes additional time for the customer to complete, given that the assumptions are not utilized. However, the system may save the data entries made during the fast quote process for subsequent use during the detailed quote process. Once the fast quote process is completed, the customer may choose to save the fast quote information for later use, or may request servicing by a customer service representative either via email or a telephone call.

Referring to FIG. 5, the assumptions utilized by the present invention may be derived from analysis of existing customer data, as illustrated by Boxes 74 and 76. Specifically, in one embodiment, the characteristics of existing customers are analyzed to determine what assumptions apply to the greatest number of customers. In using such data, the present invention allows the assumptions to apply to the greatest number of potential customers likely to access the organization's website. Further, the assumptions may be refined in light of feedback information provided by potential customers over the computer network, as illustrated by Boxes 78, 80, and 82. For example, if a potential customer indicates that one or more of the previously defined assumptions do not apply, this information is logged upon one or more storage devices and examined to determine if amendment of the assumptions is warranted. If a large number of potential customers are not able to utilize the fast quote process due to one or more assumptions, they may be amended to enable the system to service a greater number of customers. In one embodiment, such changes would be made via the external rules management system (26).

The present invention allows assumptions to be removed or amended depending on the customer at issue. Furthermore, different sets of assumptions may be created for different types of customers. For example, if the customer does not satisfy the "good credit" assumption or is of a certain age or maintains a certain military rank, he or she may be provided with a dynamically rendered screen designed to address customers, or sets of customers, who do not exactly match the predetermined assumptions. In operation, the dynamically rendered screen of the above example would simply provide the customer with a question regarding his or her credit to allow the correct information to be entered. The system would then utilize this information along with the remaining assumptions, driver information, and vehicle information to assess the risk to insure and calculate an estimated price. This feature allows the present invention to service a broad base of potential customers.

In one embodiment, the existing customer data analysis defines assumptions based upon those characteristics applying to at least eighty percent (80%) of the organization's existing customer base. For example, if eighty percent (80%) of the existing customers do not operate motorcycles, this customer characteristic may be used as an assumption for potential customers accessing the website of the present invention.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

We claim:

1. A computer-implemented method of providing pricing information, comprising:
   defining an assumption set comprising one or more assumptions, wherein said assumptions are derived from statistical data relating to a plurality of actual customers;
   receiving at a computer system a first set of information from a customer via a network;
   receiving at said computer system a second set of information from said customer via said network;
   utilizing said assumption set, said first set of information, and said second set of information, estimating a price associated with one or more products;
   sending, from said computer system to said customer, said estimated price via said network;
   dynamically updating said assumption set based upon feedback provided by a plurality of potential customers affecting statistical data related to said plurality of actual customers and said plurality of potential customers; and
   receiving at said computer system the updated assumption set from an external rules management system updating said assumption set with said external rules management system and;
   implementing with said computer system said updated assumptions set in place of said assumption set without interrupting the ability of the computer system to provide pricing information to said customer.

2. The method of claim 1, wherein said product comprises vehicle insurance.

3. The method of claim 2, wherein said assumptions comprise good credit, active driver's license, no vehicle value over a first value, vehicular usage limited to 12,000 miles for work/school, and/or all vehicles built according to a first set of regulations.

4. The method of claim 3, wherein said first value comprises $80,000.

5. The method of claim 3, wherein said first set of regulations comprise applicable Federal and State laws of the United States.

6. The method of claim 2, wherein said first set of information comprises driver information comprising number of drivers, previous insurance coverage, driver identification, and driver history.

7. The method of claim 6, wherein said second set of information comprises vehicle information comprising vehicle location, number of vehicles, make & model, and vehicle safety devices.

8. The method of claim 1, further comprising the additional steps of:
   receiving feedback information from one or more customers; and
   amending one or more of said assumptions according to said feedback information.

9. The method of claim 7, wherein said estimating step further comprises assessing the risk associated with insuring said driver, said risk assessment being calculated by an underwriting engine.

10. The method of claim 9, wherein said estimating step further comprises determining a pricing rate associated with said assessed risk, said pricing rate being calculated by a rating engine coupled to said network.

11. The method of claim 2, wherein said pricing information is provided through a web-based graphic user interface, said interface providing one or more product options.

12. The method of claim 11, wherein said product options are selected from the group consisting of minimum options, standard options, maximum options and customized options.

13. The method of claim 12, wherein said graphic user interface further comprises one or more data entry fields.

14. The method of claim 7, further comprising the additional step of offering product incentives to one or more customers.

15. The method of claim 14, wherein said product incentives are determined according to one or more incentive rules, said rules utilizing said driver information, said vehicle information and/or said assumptions to determine which customers are eligible for said incentives.

16. The method of claim 7, further comprising the additional steps of:
   storing said driver information and said vehicle information upon a storage device; and
   providing access to said driver information and said vehicle information, said information being displayed upon a dynamically rendered graphic user interface viewable by said customer or by a customer service representative.

17. The method of claim 16, wherein said graphic user interface provides said customer and said customer service representative with substantially the same navigational links, data entry fields, and selective fields.

18. A method of providing all-risk pricing information to members of an organization over a computer network comprising the steps of:

provide quoting options comprising fast quote and detailed quote pricing options;

receiving at a computer system a quote selection from a first member;

determining that said member selected said fast quote pricing option;

defining an assumption set comprising one or more assumptions applicable to at least a portion of actual members of said organization based on said quote selection, said assumptions comprising good credit, active driver's license, no vehicle value over a predefined value of at least $80,000, vehicular usage limited to 12,000 miles for work/school, and/or all vehicles built according to applicable Federal and State regulations;

receiving at a computer system driver information from a first member comprising number of drivers, previous insurance coverage, driver identification, and driver history;

receiving at said computer system vehicle information from a potential member comprising vehicle location, number of vehicles, make & model, and vehicle safety devices;

utilizing said assumption set, said driver information, and said vehicle information, calculating an estimated price to insure said potential member;

storing said driver information, said vehicle information, and said estimated price in an electronic storage device;

dynamically updating said assumption set based upon feedback provided by a plurality of potential members affecting statistical data related to a plurality of actual members and said plurality of potential members; and receiving at said computer system the updated assumption set from an external rules management system updating said assumption set with said external rules management system and;

implementing with said computer system said updated assumptions set in place of said assumption set without interrupting the ability of the computer system to provide pricing information to said members.

19. The method of claim 18, wherein said estimating step further comprises 1) assessing the risk associated with insuring said driver, said risk assessment being calculated by an underwriting engine coupled to said network and 2) determining a pricing rate associated with said assessed risk, said pricing rate being calculated by a rating engine coupled to said network.

20. The method of claim 19, further comprising the additional steps of:

confirming each of said assumptions; and providing said first member with a potentially binding cost estimate to insure.

21. The method of claim 7, wherein at least a portion of said driver information and/or said vehicle information is retrieved from a remote information source.

22. A computer system for providing pricing information comprising:

a computer system, wherein said computer system comprises:

a storage device configured to store electronic data, wherein said storage device contains an assumption set comprising one or more assumptions, wherein said assumptions are based on statistical data relating to a plurality of actual customers, an underwriting engine configured to determine a risk associated with a customer based on said assumption set, and a rating engine configured to calculate a quote for the customer based on the risk associated with the customer;

an application server for presenting a graphic user interface upon a remote workstation, said server coupled to said computer system; and an external rules management system operatively connected to said computer system, wherein said external rules management system is configured to dynamically update said assumption set based upon feedback provided by a plurality of potential customers affecting statistical data related to said plurality of actual customers and said plurality of potential customers and send said updated assumption set to said computer system; and a computer network coupled to said server and said remote station;

wherein said computer system is configured to implement said updated assumptions set in place of said assumption set such that said presentation of said graphic user interface is not interrupted.

* * * * *

UNITED STATES PATENT AND TRADEMARK OFFICE
CERTIFICATE OF CORRECTION

PATENT NO. : 7,707,049 B2 Page 1 of 1
APPLICATION NO. : 10/677763
DATED : April 27, 2010
INVENTOR(S) : Robert J. Van Cleave et al.

It is certified that error appears in the above-identified patent and that said Letters Patent is hereby corrected as shown below:

In column 1, line 3, below "Title" insert -- CROSS-REFERENCE TO RELATED APPLICATIONS --.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,707,049 B2 |
| APPLICATION NO. | : 10/677763 |
| DATED | : April 27, 2010 |
| INVENTOR(S) | : Robert J. Van Cleave et al. |

It is certified that error appears in the above-identified patent and that said Letters Patent is hereby corrected as shown below:

In column 7, line 61, in Claim 1, after "customers;" delete "and".

In column 7, line 65, in Claim 1, delete "system and;" and insert -- system; and --, therefor.

In column 9, line 34, in Claim 18, after "members;" delete "and".

In column 9, line 38, in Claim 18, delete "system and;" and insert -- system; and --, therefor.

In column 10, line 29, in Claim 22, after "system;" delete "and".

Signed and Sealed this
First Day of March, 2011

David J. Kappos
*Director of the United States Patent and Trademark Office*